United States Patent [19]

Kenny et al.

[11] Patent Number: 5,022,368
[45] Date of Patent: Jun. 11, 1991

[54] THROTTLE CABLE INTERVENTION SERVOACTUATOR

[75] Inventors: Andrew A. Kenny, Roselle; Daniel C. Stahly, Elmhurst, both of Ill.

[73] Assignee: Eaton Corporation, Cleveland, Ohio

[21] Appl. No.: 404,017

[22] Filed: Sep. 7, 1989

[51] Int. Cl.$^5$ ............................................. F02D 11/10
[52] U.S. Cl. ...................................... 123/342; 123/399
[58] Field of Search ......................... 123/342, 361, 399; 180/178, 179, 197

[56] References Cited

U.S. PATENT DOCUMENTS

| Re. 32,413 | 8/1983 | Hayashida | 123/342 |
|---|---|---|---|
| 1,582,239 | 4/1926 | Barbaron | 123/401 |
| 4,346,776 | 8/1982 | Taplin | 180/179 |
| 4,362,138 | 12/1982 | Krueger et al. | 123/342 |
| 4,380,799 | 4/1983 | Allard et al. | 364/426 |
| 4,543,932 | 10/1985 | Sturdy | 123/342 |
| 4,559,912 | 12/1985 | Larom et al. | 123/350 |
| 4,703,823 | 11/1987 | Yogo et al. | 180/197 |
| 4,747,380 | 5/1988 | Ejiri et al. | 123/399 |
| 4,750,582 | 6/1988 | Maas | 180/197 |
| 4,756,287 | 7/1988 | Sakakibara et al. | 123/342 |
| 4,795,000 | 1/1989 | Oevirk et al. | 180/176 |
| 4,811,809 | 6/1987 | Reinartz et al. | 180/197 |
| 4,838,225 | 6/1989 | Steffes | 123/342 |

FOREIGN PATENT DOCUMENTS

| 595844 | 1/1982 | Japan . |
|---|---|---|
| 5979050 | 5/1982 | Japan . |

Primary Examiner—Tony M. Argenbright
Attorney, Agent, or Firm—R. A. Johnston

[57] ABSTRACT

A throttle cable intervention servoactuator having a connector link with a lefthand thread on one end and a righthand thread on the opposite end with correspondingly threaded connecting members engage the threaded ends of the link and the members each guided in a slot in a housing for non-rotating sliding movement with the connector link. A driven gear is journaled for rotation on the housing with the connector link extending centrally through the driven gear in free sliding engagement and engaged for rotation by the gear. The driven gear is rotated by a motor in response to a signal to change the effective length between the connector members when each are connected to one end of a throttle tension cable.

12 Claims, 2 Drawing Sheets

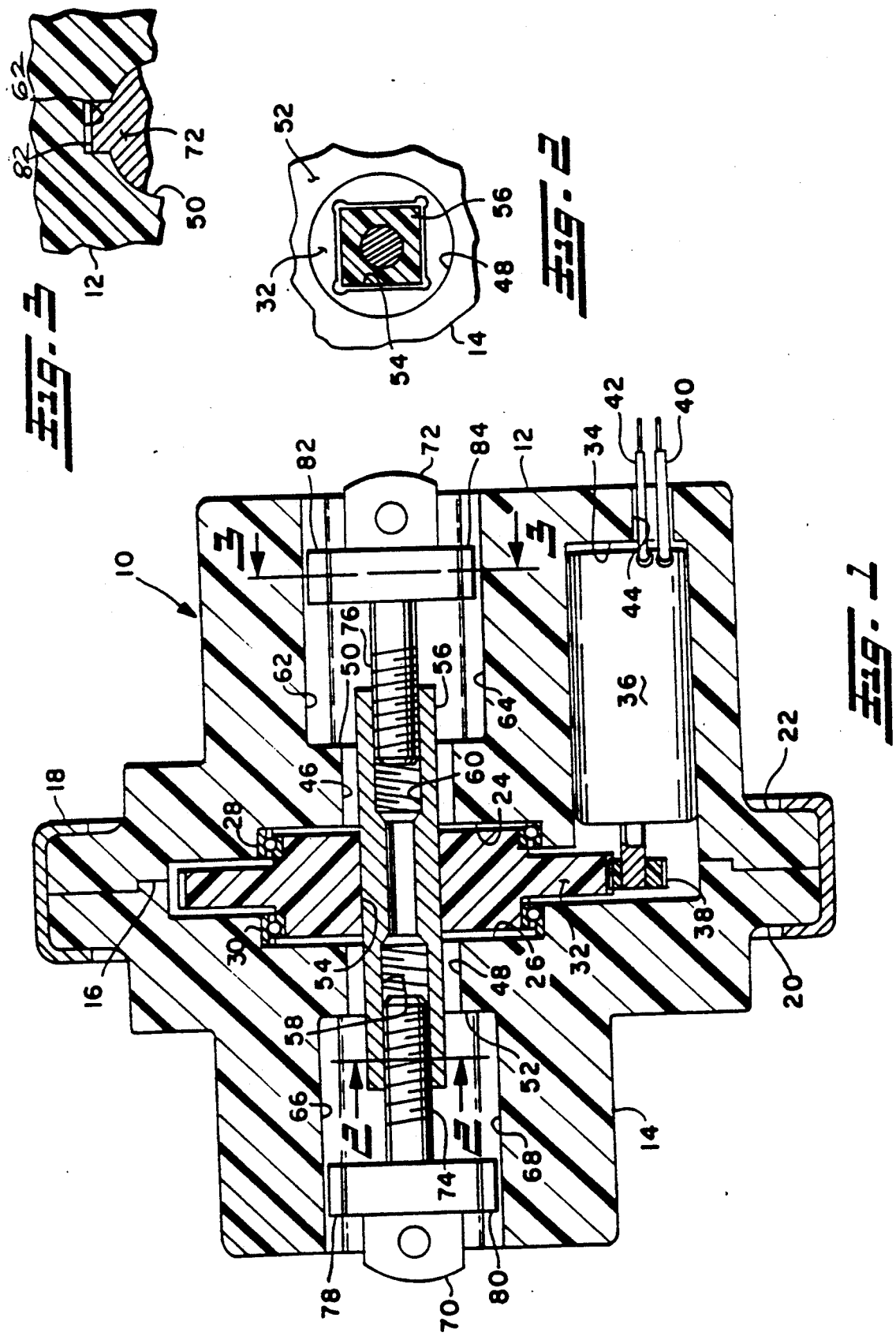

5,022,368

THROTTLE CABLE INTERVENTION SERVOACTUATOR

BACKGROUND OF THE INVENTION

The present invention relates to devices for intervening in the actuation of a vehicle throttle actuated by a driver controlled accelerator pedal typically connected to the throttle by a pivoted linkage including a tension cable. Under certain circumstances, as for example, sudden loss of wheel traction, it has been desired to provide an automatic way or means of intervening in the throttle actuation to prevent the driver from maintaining or increasing the throttle opening and to provide such intervention at a speed or rate greater than that of the physical reaction of the driver to the sudden loss of traction. In particular, it has been desired to provide throttle cable intervention in connection with the operation of vehicles equipped with anti-lock braking systems (ABS) which prevent wheel lockup upon application of the service brakes for stopping the vehicle. Vehicles equipped with ABS systems Provide imProved safety of operation by minimizing the risks of skidding and, therefore, enable the vehicle to stop in the minimum distance in the event of an emergency situation. ABS systems are, thus, a desirable feature and give the driver a sense of improved control of the vehicle. Where the driver is aware that the vehicle is equipped with ABS, it has also been found desirable to provide a traction control system which prevents wheel slippage in the power-on mode under conditions of vehicle operation on slippery road surfaces such as encountered in driving on ice or snow.

In order to provide traction control capable of responding to sudden loss of wheel traction at a rate faster than driver can physically react, it has been necessary to Provide electrical actuators for the engine throttle which can respond to a control signal generated by wheel slip sensors. However, there has been some reluctance in providing an all electric throttle actuation system for normal vehicle operation; and, it has been desired to retain the usual mechanical throttle tension cable linkage between the vehicle accelerator and the engine throttle. Therefore, it has been desired to provide an electrically operated throttle cable intervention device which can override the throttle actuation by the driver in the event of sudden loss of wheel traction but otherwise operates in the conventional mechanical cable tension mode from the vehicle accelerator. The problem has thus been to find a simple reliable and inexpensive servoactuator for throttle cable intervention to provide for changing the length of the throttle tension cable automatically by electrical operation of the servoactuator at a rate faster than the driver's physical reaction and to otherwise maintain normal mechanical throttle operation by the vehicle accelerator pedal when there is no loss of wheel traction.

SUMMARY OF THE INVENTION

The present invention provides an electrically operated low-voltage direct current servoactuator for interrupting a vehicle engine throttle cable as a tension link and electrically operated for changing the length of the tension link in the throttle cable. The servoactuator of the present invention is operated electrically as a turnbuckle to change the length of the tension link responsive to an electrical control signal which may be derived from wheel speed sensors.

The servoactuator of the present invention is intended to be employed for throttle intervention in connection with traction control systems employed on a motor vehicle.

The servoactuator of the present invention employs a split housing which is joined along a parting line to journal a rotatable gear driven by a DC motor pinion. The gear has a polygonal or splined central aperture which has received therethrough and guided for sliding movement therein a connector link having a correspondingly shaped polygonal or splined cross-section such that the link rotates with the gear. The opposite ends of the link are threaded with respectively lefthand and righthand threads, which threadedly engage connector members which are slidably guided in the body and prevented from rotation. Each of the end connectors is adapted for connection to the throttle tension cable to provide an in-line tension link. The Polygonally shaped or splined tension link is thus free to move in the direction of tension within the central aperture of the driven gear and maintains a mechanical tension in the throttle cable.

Upon energization of the servomotor, the gear is rotated to turn the connector link and cause axial movement of the oppositely threaded members to change the effective length of the connector link between its attachment to the throttle cable. The servoactuator of the present invention thus maintains free sliding engagement of a throttle tension link, yet permits automatic rotation and changing of the effective length of the link when throttle intervention is desired for traction control purposes.

BRIEF DESCRIPTION OF THE DRAWINGS

FIG. 1 is a cross-sectional view of the servoactuator assembly of the present invention;

FIG. 2 is a partial section view taken along section indicating lines 2—2 of FIG. 1;

FIG. 3 is a partial section view taken along section indicating lines 3—3 of FIG. 1;

DETAILED DESCRIPTION

Figure 4:
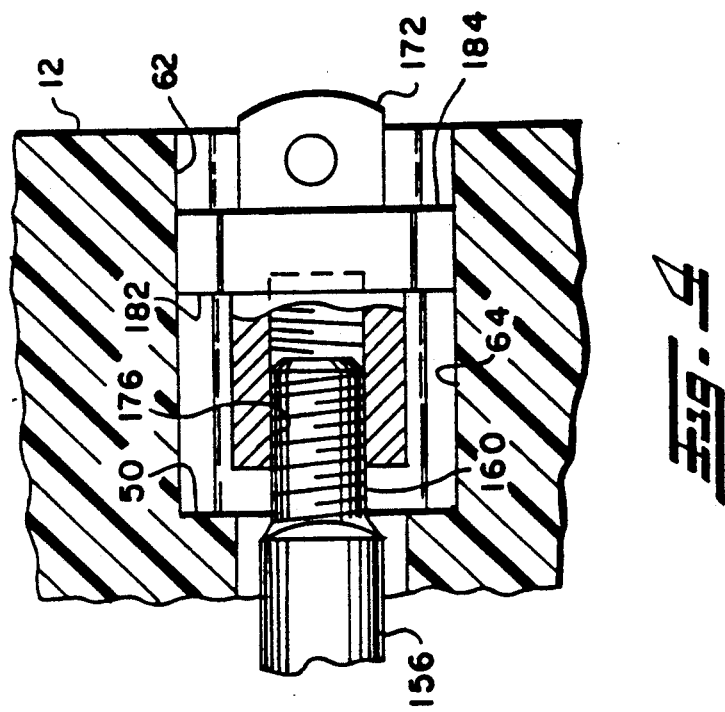
FIG. 4 is an alternate arrangement of the servoactuator of FIG. 1.

Referring to FIG. 1, the servoactuator is indicated generally at 10 and has a split housing comprising half shells 12, 14 joined about parting line 16 and retained by a suitable peripheral clamping band 18 which may be crimped or deformed over peripheral flanges 20, 22 provided on the half shells. The half shells 12, 14 have respectively formed therein oppositely disposed counterbores or recesses noted respectively by reference numerals 24, 26, each of which has provided therein a bearing denoted respectively 28, 30, which has journalled therein. A centrally disposed driven gear 32 and has a central built with oPPosite ends thereof journalled in bearings 28, 30 and which is free to rotate in the bearings 28, 30 with respect to the housing shells.

Housing half shell 12 has a cavity or recess 34 provided therein which has received therein a small, subfractional horsepower DC motor 36, which has a pinion 38 provided on the shaft thereof; and the pinion engages the outer peripheral teeth of the driven gear 32. The motor 36 has a pair of electrical connector leads, 40, 42, which extend externally of the housing shell 12 through an aperture 44 provided therein. It will be understood that upon energization of the motor 36, the pinion 38 causes gear 32 to rotate in the bearings 30, 28.

The housing half shells 12, 14 each has a central through bore noted respectively 46, 48 which bores are counterbored respectively and noted by the references numerals 50, 52.

Referring to FIGS. 1 and 2, the driven gear 32 has a central aperture 54 provided therein which has in the embodiment of FIG. 2 a polygonal or square configuration. A central tension link member 56 having a corresponding polygonal shape is received in the aperture 54 in free sliding arrangement. The ends of tension link 56 have provided therein suitable threads indicated by reference numerals 58, 60 and which are threaded in the opposite sense; that is, one end has a lefthanded thread, and the opposite end has a righthanded thread therein.

Referring to FIGS. 1 and 3, the counterbore 50 provided in housing shell 12 is illustrated as having a diametrally oppositely disposed grooves 62, 64 provided therein having a generally rectangular cross-section as illustrated in FIG. 3; and, a corresponding pair of oPpositely disposed grooves 66, 68 are formed in the counterbore 52 in housing shell 14.

A pair of connecting members 70, 72 are provided with respectively threaded shafts 74, 76 provided thereon with each of the threaded shafts having threads provided thereon in the opposite sense and received in the threaded bores 58, 60 Provided in the tension link 56. Each of the connector members 70, 72 has a pair of diametrally oppositely disposed ribs denoted by references numerals 78, 80 on connector 70 and 82, 84 on connector 72. The ribs 78, 80 have a transverse configuration sufficient to engage and be slidably guided by the grooves 66, 68 and housing shell 14. In similar manner, the ribs 82, 84 are configured to be received in and slidably guided by grooves 62, 64 in the housing shell 12. The engagement of the rib 82 and groove 62 is illustrated typically in FIG. 3.

It will be understood that as the gear 32 rotates tension link 56, the threaded portions 74, 76 of the connector 70, 72 are caused to increasingly engage or disengage the threads 58, 60 depending upon the direction of rotation of the gear 32 and, thus, causes an effective lengthening or shortening of the overall linkage including the members 70 and 72. The members 70 and 72 are restrained from rotation by the engagement of the ribs with the grooves in the housing; and however, members 70 and 72 are otherwise free to slide in the grooves axially with the link 56.

Referring to FIG. 4, an alternate arrangement of the end connectors is shown wherein the tension link 156 has external threads 160 provided thereon which engage internal threads 176 provided in the end connector 172 which is guided in grooves 62, 64 by a pair of oppositely disposed ribs 182, 184.

Figure 5:
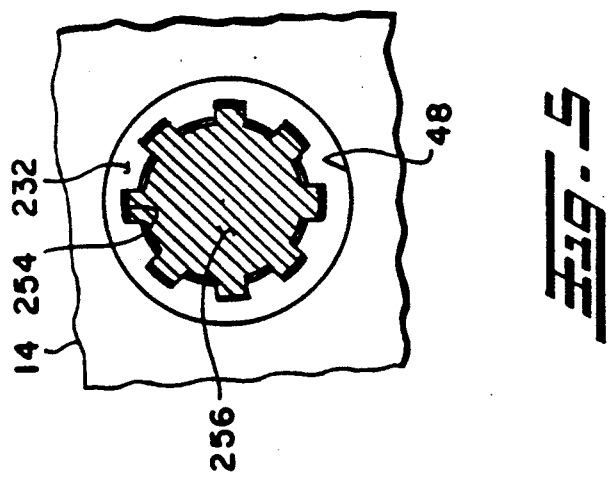
FIG. 5 is a view similar to FIG. 2 showing an alternative embodiment.

Referring to FIG. 5 an alternate embodiment of the driven gear denoted 232 has the central aperture 254 provided in the form of an internally-splined surface which is engaged by a corresponding externally-splined surface on the periphery of the tension link 256 which is axially slidably received therein and engaged for rotation with the gear 232.

The servoactuator of the present invention thus provides a simple, reliable yet economical, electrically power adjustable tension link which may be inserted in a throttle cable for enabling automatic electrically controlled shortening or lengthening of the cable more rapidly than could be Performed by driver control of an accelerator for use in traction control of the vehicle drive wheels. The adjustable link is slidably received through a gear and is rotated by the gear to vary the length of the cable in a manner analogous to a turnbuckle.

Although the servoactuator of the present invention has hereinabove been described with respect to the illustrated embodiments, it will be understood that the invention is capable of modification and variation and is intended as limited only by the scope of the following claims.

We claim:

1. A throttle cable intervention servoactuator comprising;
    (a) housing means;
    (b) motor means including speed reducing means disposed on said housing means and operated upon energization by an electrical control signal;
    (c) an input member movably disposed on said housing means, said input member adapted for connection to a vehicle accelerator pedal tension link;
    (d) an output member movably disposed on said housing means, said output member adapted for connection to a vehicle engine throttle tension link;
    (e) a connector link having said input member threadedly connected to one end thereof and said output member threadedly connected to the opposite end thereof, said connector disposed in said housing and movable with respect thereto in the direction of said tension;
    (f) adjustment means drivingly connecting said speed reducing means to said connector link for rotation thereof, said adjustment means operable upon energization of said motor means to rotate said connector link to change the effective length of said connector link with respect to the connection to said input and output member, wherein said connector link is freely slidably disposed through said adjustment means.

2. The servoactuator described in claim 1, wherein said adjustment means comprises a turnbuckle mechanism, with said adjustment means journalled for rotation in said housing means, with said connector link guided centrally therethrough and engaged for rotary movement by said adjustment means.

3. A throttle cable intervention mechanism for a vehicle throttle cable comprising:
    (a) connector means having a first structural portion thereof adapted for connection to a vehicle accelerator tension link and a second structural portion thereof adapted for connection to a vehicle engine throttle tension link;
    (b) housing means having an adjustment means rotatably mounted thereon, with said connector means received on said adjustment means for rotation therewith and axial movement with respect thereto;
    (c) motorized means disposed on said housing means and operable upon receipt of an electrical control signal to rotate said adjustment means for varying the effective length of said connector means with respect to the connections to said first and second structural portions; and
    (d) means operative to prevent rotation of said tension link with respect to said housing means.

4. The mechanism defined in claim 3, further comprising feedback means operable to provide an electrical signal indicative of the change in position of said first and second structural portions with respect to said housing means thereby providing an indication of the change in effective tension length of said connector means.

5. The mechanism defined in claim 3 further comprising potentiometer means operable to provide an electrical indication of the change in position of said first and second structural portions with respect to a common reference thereby providing an indication of the change in tension length of said connector means.

6. The servoactuator defined in claim 1 further comprising; position sensor means disposed on said housing and operative in response to movement of at least one of said input and output member to provide a position feedback signal for use in generating said control signal for said motor means.

7. The servoactuator defined in claim 1 wherein said adjustment means has said connector link slidably splined therein.

8. A throttle tension linkage intervention assembly comprising:
 (a) a housing;
 (b) a tension link rotatably mounted on said housing;
 (c) a force input member engaging one end of said link with an axially inclined surface permitting relative rotation therebetween, said force input member guided on said housing for movement in a direction generally parallel to the axis of rotation of said link, said input member adapted for connection to one cable end of a splice in said throttle tension cable;
 (d) a reaction force output member engaging the end of said link opposite said input member, said output member engaging said link with an axially inclined surface permitting relative rotation therebetween, said output member guided on said housing for movement in a direction generally corresponding to the axis of rotation of said link, said output member adapted for connection to the other cable and of said splice; and,
 (e) motor means operative in response to an electrical control signal for rotating said link and varying the effective cable tension length of said assembly.

9. An intervention servoactuator assembly for varying length of a throttle tension linkage comprising:
 (a) housing means;
 (b) an adjustment member mounted on said housing for rotation thereon;
 (c) a connecting member guided for free sliding movement on said adjustment member and rotatable therewith, said connecting member adapted for connection to one end of said throttle tension linkage and for relative rotation with respect thereto;
 (d) an output member adapted for connection to the other end of said tension linkage and connected to said connecting member in a manner permitting relative rotation and axial movement with respect thereto, said output member guided for said axial movement on said housing;
 (e) motorized means disposed on said housing operable upon receipt of an electrical control signal to rotate said adjustment means for the effective length of said assembly when incorporated in a throttle linkage.

10. The assembly defined in claim 8 wherein said axially inclined surface comprises a threaded surface.

11. The assembly defined in claim 9 wherein said motorized means includes a D.C. servomotor and a connecting member position sensor mounted on said housing and operable for providing a position feedback signal for use in generating the electrical control signal.

12. A throttle linkage intervention servoactuator comprising:
 (a) housing means;
 (b) motor means including speed reducer means having an output member rotatably disposed on said housing means and operative upon energization by an electrical control signal to rotate said output member;
 (c) a variable length connector link means adapted for connection at its opposite ends in the line of action of a throttle linkage member, said connector link means having
  (i) a first end connector and a second end connector,
  (ii) an adjustment link having said first connector threadedly engaging one end thereof and said second connector link threadedly engaging the opposite end thereof; said first and second connectors having threaded engagement of opposite sense;
  (iii) said adjustment link being guided for sliding movement on said speed reducer means output member along the axis of rotation thereof; and
 (d) means operative to guide said first and second end connector for sliding movement on said housing means, and operative to prevent rotation thereof with respect to said housing means; wherein said speed reducer means is operative for rotating said adjustment link for varying the distance between said first and second end connectors.

* * * * *